United States Patent [19]

Watanabe et al.

[11] Patent Number: 4,574,304
[45] Date of Patent: Mar. 4, 1986

[54] AUDIENCE RATING MEASURING SYSTEM FOR TELEVISION AND VIDEO TAPE RECORDER

[75] Inventors: Fumio Watanabe, Zama; Yoshikazu Itoh, Kunitachi, both of Japan

[73] Assignee: Video Research Limited, Tokyo, Japan

[21] Appl. No.: 602,404

[22] Filed: Apr. 20, 1984

[30] Foreign Application Priority Data

Apr. 22, 1983 [JP] Japan .................................. 58-71221
Jun. 17, 1983 [JP] Japan ................................. 58-107896
Jun. 17, 1983 [JP] Japan ................................. 58-107897

[51] Int. Cl.$^4$ ...................... H04N 17/04; H04N 17/06
[52] U.S. Cl. ........................................ 358/84; 455/2
[58] Field of Search ................... 179/2 AS; 358/84; 455/2

[56] References Cited

U.S. PATENT DOCUMENTS 3,803,349  4/1974  Watanabe ............................. 358/84
4,245,245  1/1981  Matsumoto et al. ............. 358/84 X
4,511,917  4/1985  Köhler et al. ........................ 358/84

*Primary Examiner*—Keith E. George
*Attorney, Agent, or Firm*—Roberts, Spiecens & Cohen

[57] ABSTRACT

The invention relates to an audience rating measuring system for a television and a video tape recorder and provides an audience rating measuring system which can give accurate audience data under various conditions, such as when a television and a video tape recorder are used in combination, that can not be measured by the conventional audience rating measuring systems in general use. The audience rating measuring system of the invention comprises means for video tape recorder channel discrimination, video tape recorder operation mode discrimination, and television channel discrimination.

6 Claims, 11 Drawing Figures

MODE DETECTOR 13

DATA ENCODER 15

AUDIENCE RATING MEASURING SYSTEM FOR TELEVISION AND VIDEO TAPE RECORDER

BACKGROUND OF THE INVENTION

1. Field of the Invention

This invention relates to an audience rating measuring system for a television and a video tape recorder.

2. Description of the Prior Art

A measuring system called a "Video Meter" has been used in the past to measure the audience rating of television. The Video Meter stores the ON/OFF times of a television receiver, the channel of the program viewed and other data on paper tape or in other memory devices.

As home use video tape recorders have become extremely popular in recent years, however, the conventional audience rating measuring systems cannot cope with the situation. For as long as the television receivers are used alone, the audience state can be accurately determined from audience data such as the ON/OFF status of the television receivers and the channel number because the program is being viewed as it is broadcast. If the television receiver is used in combination with a video tape recorder, however, the viewer does not always view the program on a real time basis but may perhaps record the program and play it back later.

Accordingly, conventional audience measuring systems such as the Video Meter described above have the drawback that although they can record data on programs that are actually viewed when they are received, they cannot provide any data on the use of a video tape recorder.

In the conventional measuring systems of the kind described above, the following method has been used as one of the techniques for detecting the reception channel of the television. Namely, a signal is taken from a sound intermediate frequency circuit inside the television receiver and is compared with a sound intermediate frequency signal obtained from another tuner disposed in the measuring system. The reception channel of the television receiver is determined by sequentially changing the tuning positions of the other tuner until a position is reached where both signals coincide with each other. When a video tape recorder is used in conjunction with the television receiver, however, channel determination as described above cannot be made in the case where the television tuner is set to an unassigned channel allotted to the radio frequency output signal of the video tape recorder in order to view the program by a re-modulated radio frequency signal. This problem is even more difficult when a dial type channel television receiver is combined with a touch type channel video tape recorder because a desired station can be tuned more easily by the touch channel type. In preparation for making a video recording, the channel of the video tape recorder is set to allow monitoring the program through the television receiver.

The problem here is that since the radio wave received by the television receiver is re-modulated inside the video tape recorder, it is different from the sound carrier frequency actually broadcast by the station as is the frequency of the sound intermediate frequency signal. Namely, a radio frequency signal applied to the television receiver from the video tape recorder in order to monitor the program is a re-modulated wave made from an carrier generated in a oscillator disposed in the video tape recorder. Accordingly, it becomes impossible to determine whether the sound intermediate frequency signals are coincident or not by comparing them with each other. Thus, the reception channel of a television cannot be reliably determined.

SUMMARY OF THE INVENTION

The present invention is directed to eliminating the problems with the type of prior art system described above.

A primary object of the present invention is to provide an audience rating measuring system for a television with an attached video tape recorder which detects the operation mode of the video tape recorder, determines the reception channel and makes it possible to obtain data on the operation modes of the video tape recorder.

It is another object of the present invention to provide an audience rating measuring system for a television with an attached video tape recorder which detects the reception channel and operation modes of the video tape recorder and determines the reception channel of the television and whether the television receives the broadcast wave on the air directly or receives the program from the video tape recorder.

These and other objects of the invention will become more apparent from the following description of the specification.

Briefly stated, the audience rating measuring system for a television and an attached video tape recorder in accordance with the present invention includes means for determining the video tape recorder channel, the video tape recorder operation mode, and the television channel.

DESCRIPTION OF THE PREFERRED EMBODIMENT

Figure 1:
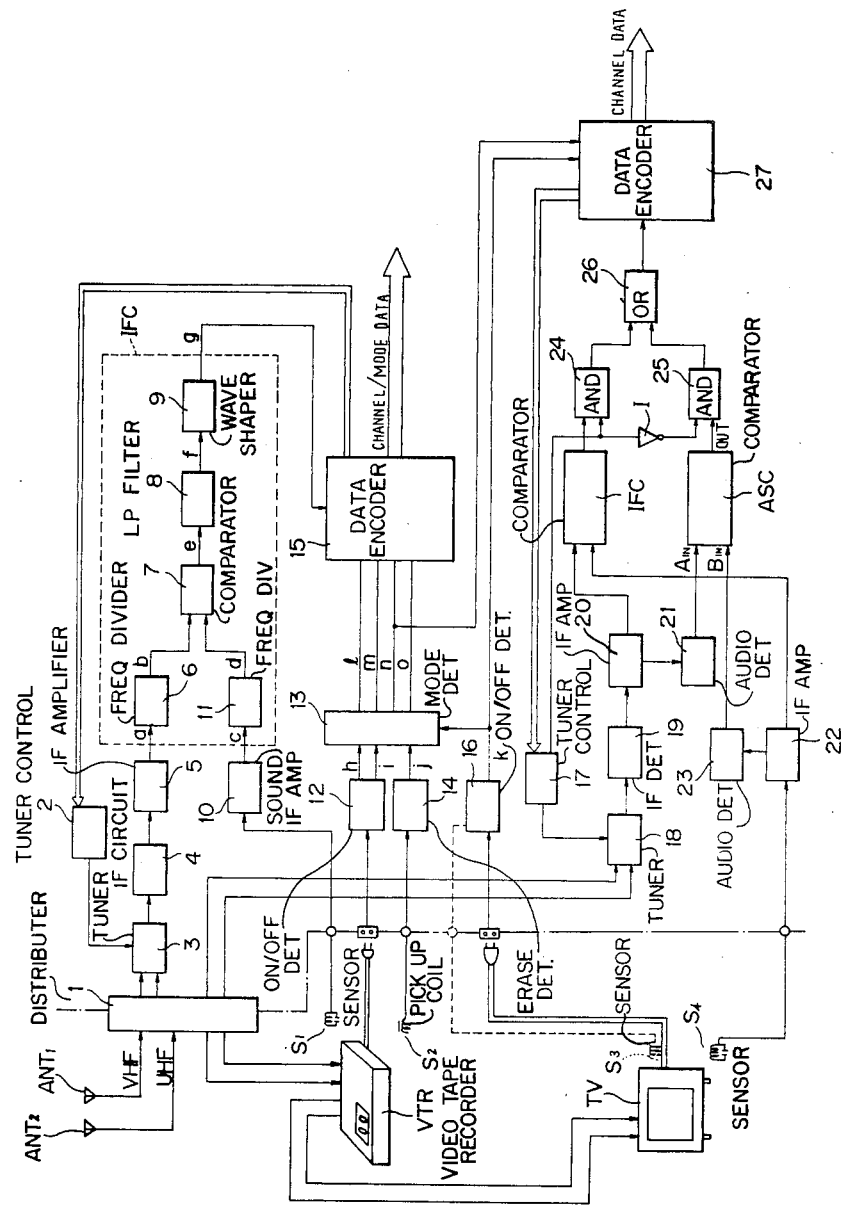
FIG. 1 is a block diagram of the presently preferred embodiment of the present invention.

FIG. 1 is a block diagram showing in detail one embodiment of the present invention, which will be described with reference to the drawings.

In FIG. 1, the reception signals from a VHF antenna $ANT_1$ and a UHF antenna $ANT_2$ are distributed by a distributor 1 to a video tape recorder VTR and to a VHF-UHF combination tuner (hereinafter referred to as a "tuner") 3, 18; and the antenna terminal of a television TV is connected to the radio frequency output terminal of the video tape recorder VTR.

Also, a tuning control voltage generation circuit 2, the tuner 3, a video intermediate frequency amplification-detection circuit 4, a sound intermediate frequency amplifier 5, a frequency divider 6, a comparison circuit 7, a lowpass filter 8, a waveform shaping circuit 9, a sound intermediate frequency amplification circuit 10 and a frequency divider 11 together form a circuit which discriminates or determines the reception channel of the video tape recorder VTR; and a sensor $S_1$ is disposed inside the video tape recorder in order to detect the sound intermediate frequency signal generated by the reception circuit inside the video tape recorder VTR.

Next, power ON/OFF detection circuits 12, 16, an erase signal detection circuit 14, a mode discrimination circuit 13 and a data encoder 15 together form a circuit which discriminates the operation mode of the video tape recorder VTR; and a pickup coil $S_2$ is disposed inside the video tape recorder VTR to detect the erase signal. Incidentally, the power ON/OFF detection circuit 12 discriminates the weakened standby current of the video tape recorder VTR from the larger current when the motor starts rotating and the driving mechanism (hereinafter referred to as the "mechanical unit") starts operating, and determines the ON/OFF status of the power source as well as the ON/OFF status of the mechanical unit. On the other hand, the power ON/OFF detection circuit 16, detects the inflow of a current from the power line of the television TV and detects the ON/OFF of the power switch of the television TV.

A tuning control voltage generation circuit 17, a tuner 18, a video intermediate frequency amplification-detection circuit 19, a sound intermediate frequency amplification circuit 20, an audio detection-amplification circuit 21, a sound intermediate frequency amplification circuit 22, a audio detection-amplification circuit 23, an sound intermediate frequency signal comparison circuit IFC, an audio signal comparison circuit ASC, AND circuits 24, 25, an OR circuit 26 and a data encoder 27 together form a circuit which discriminates the reception channel of the television TV; and a sensor $S_4$ is disposed inside the television set to detect the sound intermediate frequency signal of the television TV. Incidentally, the sound intermediate frequency signal comparison circuit IFC has the same circuit construction as the frequency dividers 6, 11, the comparison circuit 7, the lowpass filter 8 and the waveform shaping circuit 9 that are encircled by dashed lines in the video tape recorder channel discrimination circuit diagram.

The operation of the video tape recorder channel discrimination circuit, the video tape recorder mode discrimination circuit and the television channel discrimination circuit will be described in detail individually.

First, the operation for discriminating the reception channels of the video tape recorder VTR will be described. In FIG. 1, the tuner 3 independently receives the VHF and UHF broadcasting in accordance with the tuning control voltage of the tuning control voltage generation circuit 2, and the output signal of the tuner 3 (which is frequency-converted to the video intermediate frequency) is demodulated to a composite signal by the video intermediate frequency amplification-detection circuit 4. The sound intermediate frequency signal is then extracted by the sound intermediate frequency amplification circuit 5.

Figure 2:
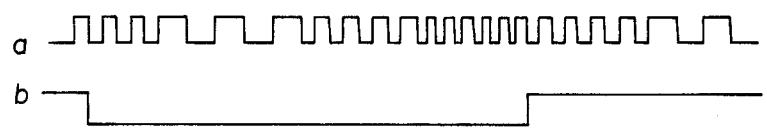
FIGS. 2 and 3 are diagrams of the waveforms of the operation of the embodiment shown in FIG. 1.

On the other hand, the sensor $S_1$ detects the sound intermediate frequency signal from the reception circuit inside the video tape recorder VTR. The signal is then amplified to the necessary level by the sound intermediate frequency amplification circuit 10. Next, the signals passing through the sound intermediate frequency amplification circuits 5 and 10 are frequency-divided by the frequency dividers 6 and 11 and are thereafter applied to the comparison circuit 7. The frequency dividers are interposed in order to carry out stably the comparison of the two signals. Frequency-division can be practically carried out by dividing by about 16. FIG. 2 illustrates the output signal a of the sound intermediate frequency amplification circuit 5 and the output signal b of the frequency divider 6, which divides by 16. The signal is then sent to the comparison circuit 7. This same sequence applies to the output signals c and d of the sound intermediate frequency amplification circuit 10 and frequency divider 11.

Figure 3:
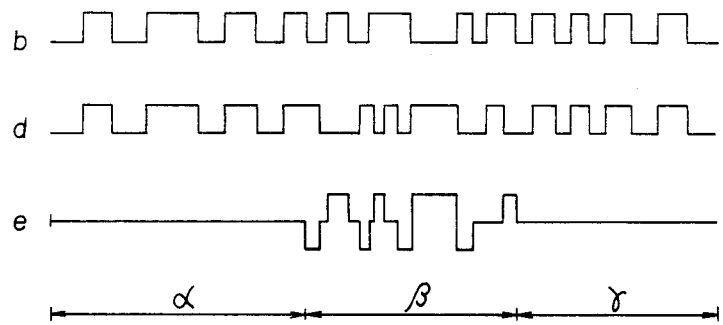

Next, the comparison circuit 7 compares the voltages of signals b and d and determines whether or not they are from the same broadcast. FIG. 3 illustrates the two signals b and d applied to the comparison circuit 7 and its output signal e. In the drawing, the periods ($\alpha$) and ($\gamma$) represent the state where the same broadcast is received, while the period ($\beta$) represents the state where the tuner 3 and the video tape recorder VTR are receiving different channels. The output signal of the comparison circuit 7 is passed through the lowpass filter 8 to remove its high frequency component and is applied to the waveform shaping circuit 9 which shapes it to a square control signal g. The signal g is then applied to a counter CNT disposed inside the data encoder 15. This counter CNT (FIG. 6) contains a clock generator and continues or stops its counting in accordance with the value (high or low level) of the output signal g of the waveform shaping circuit 9. Its binary output terminal is connected to the tuning control voltage generation circuit 2.

During the period in which the control signal g of the counter CNT is high, that is, during the period in which the reception channels of the tuner 3 and video tape recorder VTR are different from each other, the counter CNT continues counting and changes the generation voltage of the tuning control voltage generation circuit 2 until the channel received by the tuner 3 coincides with the reception channel of the video tape recorder VTR. Accordingly, after the output signal g of the waveform shaping circuit 9 settles steadily at the low level, the binary output of the counter CNT represents the reception channel, and serves as the data for determining the channel. Incidentally, the data encoder 15 also encodes the output of the counter CNT and the data indicating the operation mode of the video tape recorder VTR, which will be described elsewhere, and producing their output. The output signal of data encoder 15 is delivered to a recording mechanism or to a memory unit (not shown).

Next, the technique for determining the operation mode of the video tape recorder VTR will be described. In FIG. 1, the operation made of the video tape recorder VTR is detected by the power ON/OFF detection circuits 12, 16 and the erase signal pickup coil $S_2$; the outputs of these circuits determine the operation mode. In other words, the operation modes of the video tape recorder VTR can be broadly classified into the four modes tabulated below, and the operation discrimination or determining circuit 13 discriminates or determines the operation mode by logic calculation:

|  | MODE | VTR | TV | Mechanical unit | Erase signal |
|---|---|---|---|---|---|
| STOP | OFF | OFF | OFF | OFF | OFF |
| OPERATION | MONITOR | ON | ON | OFF | OFF |
| ATION | PLAYBACK | ON | ON | ON | OFF |

| MODE | VTR | TV | Mechanical unit | Erase signal |
|---|---|---|---|---|
| -continued | | | | |
| RECORDING | ON | ON/OFF | ON | ON |

Figure 4:
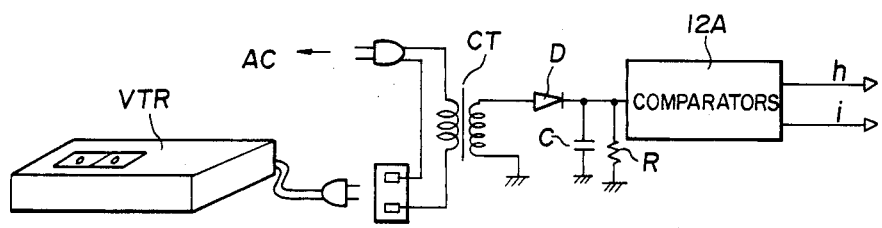
FIGS. 4 through 7 are circuit diagrams of the principal circuits of the embodiment shown in FIG. 1.

FIG. 4 illustrates more definitely the construction of the power ON/OFF detection circuit 12 described earlier. The primary winding of a current transformer CT is interposed into one of the lines between the power plug of the video tape recorder VTR and the AC power source. After the power generated in the secondary winding of the current transformer CT is rectified by a diode D, it is smoothed and delayed suitably by a capacitor C and a resistor R so that the discrimination circuit 12A can determine the ON/OFF state of the power source as well as that of the mechanical unit. In other words, the discrimination circuit 12A has two comparison levels and discriminates the current flowing into the circuit when the power is turned on from the relatively larger current flowing through the motor after the mechanical unit starts operating, thereby providing both the power ON/OFF signal h and the mechanical unit ON/OFF signal i.

Though the power ON/OFF detection circuit 16 detecting the power-ON of the television TV may be constructed in the same way as the detection circuit 12, it has a single comparison level because only the ON/OFF of the power source needs to be detected. The power ON/OFF detection circuit 16 is not limited to the construction described above, in particular, but may be constructed in different ways. For example, the ON/OFF signal of the television TV can be obtained by disposing the pickup coil $S_3$ inside the television as represented by the dashed line in FIG. 1, detecting the horizontal sync signal of 15.75 KHz, for instance, generated when the receiver is operating, amplifying this detection signal and converting it to a d.c. signal and obtaining the ON/OFF signal from the presence or absence of the horizontal synch signal. In this case, connection to the power line of the television TV is no longer necessary.

Figure 5:
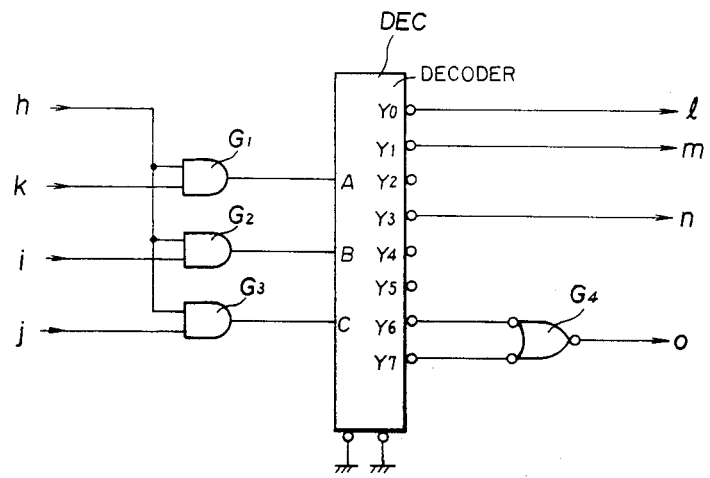

FIG. 5 illustrates a definite example of the operation discrimination circuit or mode detector 13. It consists of gates $G_1$, $G_2$, $G_3$, $G_4$ and a decoder (e.g., TTL-IC 74LS138) DEC. The signal h of the power ON/OFF detection circuit 12 representing the status of the power source of the video tape recorder VTR is applied in common to one input terminal of each of the gates $G_1$, $G_2$, $G_3$, and the signal k of the power ON/OFF detection circuit 16 representing the ON/OFF status of the television TV is applied to the other input terminal of the gate $G_1$. The signal i of the power ON/OFF detection circuit 12 representing the operation of the mechanical unit of the video tape recorder VTR is applied to the other input terminal of the gate $G_2$, and the output signal j of the erase signal detection circuit 14 is applied to the other input terminal of the gate $G_3$.

Next, the output terminals of the gates $G_1$, $G_2$, $G_3$ are connected to the input terminals A, B C, respectively, of the decoder DEC to obtain from the decoder, a signal l representing the OFF status of the video tape recorder VTR, a signal m representing its monitor state, a signal n representing its playback mode and a signal o representing its recording mode through the gate $G_4$.

In other words, the state of the video tape recorder can be classified broadly in the four modes: OFF, monitor (in which neither recording nor playback is done but the TV program is viewed), playback and recording, as described above. These modes are determined by effecting suitable logic calculations according to the status of the ON/OFF signal from the video tape recorder power supply, the ON/OFF signal from the mechanical unit, the ON/OFF signal from the television TV's power source, and the erase signal. Here, the erase signal generated during recording is detected so as to discriminate the recording mode from the playback mode because both the recording mode and the playback mode exist when the mechanical unit of the video tape recorder is operating.

The case where TTL-IC 74LS138 type integrated circuit is used as the decoder DEC will be described as a definite example. The signals h, k, i and j are positive logic and the high level corresponds to the ON state of each object for detection. The signals l, m, n and o are negative logic and their low levels correspond to the OFF mode, monitor mode, playback mode and recording mode. The truth table of the 74LS138 integrated circuit as the decoder DEC is tabulated below:

| C | B | A | $Y_0$ | $Y_1$ | $Y_2$ | $Y_3$ | $Y_4$ | $Y_5$ | $Y_6$ | $Y_7$ |
|---|---|---|---|---|---|---|---|---|---|---|
| L | L | L | L | H | H | H | H | H | H | H |
| L | L | H | H | L | H | H | H | H | H | H |
| L | H | L | H | H | L | H | H | H | H | H |
| L | H | H | H | H | H | L | H | H | H | H |
| H | L | L | H | H | H | H | L | H | H | H |
| H | L | H | H | H | H | H | H | L | H | H |
| H | H | L | H | H | H | H | H | H | L | H |
| H | H | H | H | H | H | H | H | H | H | L |

In the OFF mode (h=L, k=L, i=L, j=L), for example, A=L, B=L, C=L and $Y_0$=L. In the monitor mode (h=H, k=H, i=L, j=L), A=H, B=L, C=L and $Y_1$=L. In the playback mode (h=H, k=H, i=H, j=L), A=H, B=H, C=L and $Y_3$=L. In the recording mode (h=H, k=H/L, i=H, j=H), A=L, B=H, C=H or A=H, B=H, C=H and $Y_6$ or $Y_7$=L. Accordingly, the signals, l, m, n, o become the signals defining each operation mode.

Figure 6:
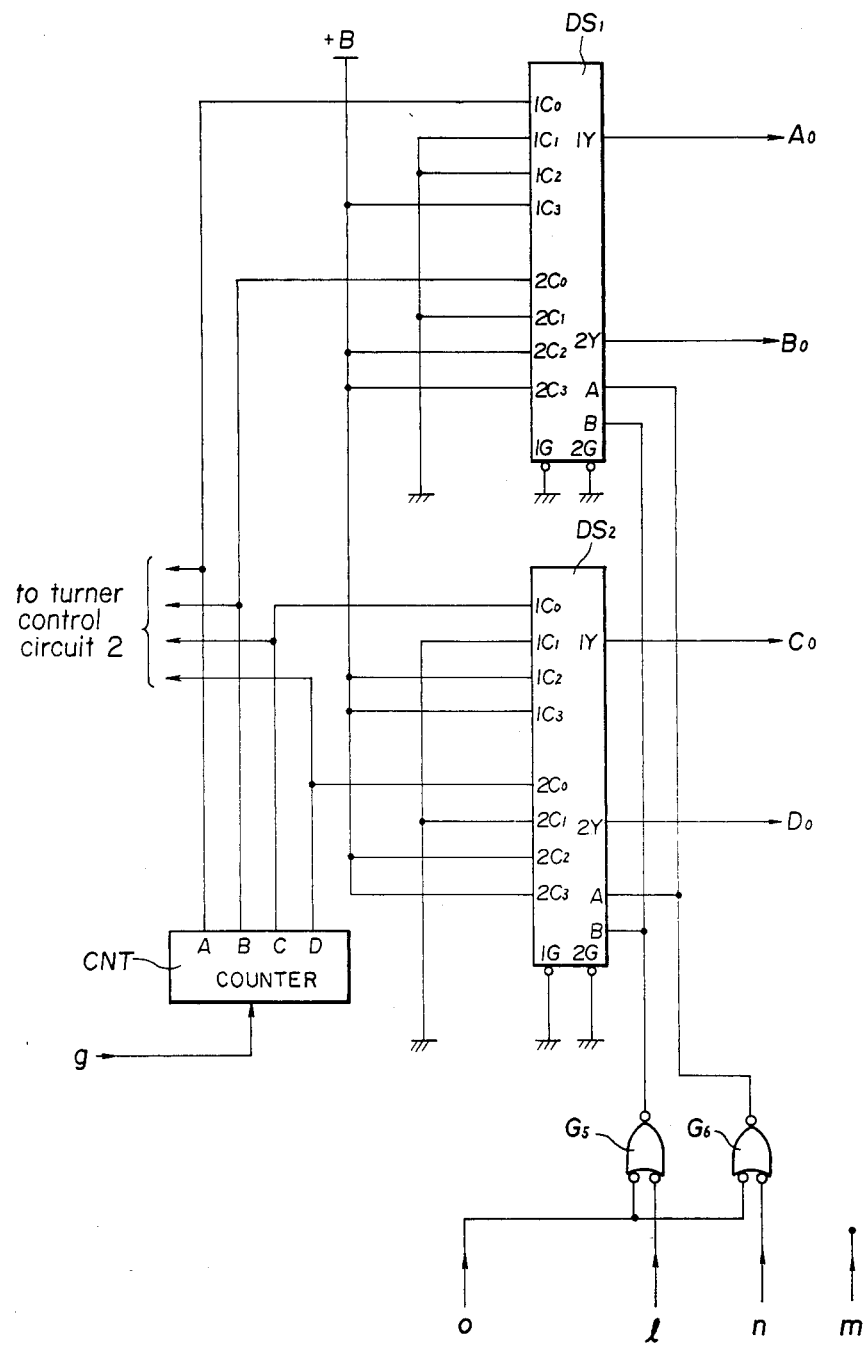

FIG. 6 illustrates one definite example of the data encoder 15. The encoder consists of gates $G_5$, $G_6$ to which the output signals of the operation discrimination circuit 13 are applied, the counter CNT and data selectors $DS_1$, $DS_2$. The data selectors (e.g. TTL-IC, 74LS153) $DS_1$, $DS_2$ transmit the signals applied to their input terminals $1C_0$–$1C_3$ ($2C_0$–$2C_3$) from their output terminals 1Y (2Y) in accordance with the binary code applied to the select inputs A, B. The outputs of the gates $G_5$, $G_6$ are applied to the select inputs A, B and the signal o representing the recording mode of the operation discrimination circuit 13 is applied to one input terminal each of the gates $G_5$, $G_6$. The signal l representing the power OFF status of the video tape recorder VTR is applied to the other input terminal of the gate $G_5$; and the signal n representing the playback mode to the other input terminal of the gate $G_6$. On the other hand, the counter CNT contains a clock generator and has the function of continuing or stopping its counting operation in accordance with the value (high or low level) of the output signal g of the aforementioned waveform shaping circuit 9. Its binary output terminals are connected to the input terminals $1C_0$, $2C_0$ of the data selectors $DS_1$, $DS_2$ and also to the tuning control voltage generation circuit 2.

The data encoder 15 encodes the data representing the operation modes of the video tape recorder VTR and the data on the reception channels of the video tape recorder for data recording or transfer.

The case where a TTL-IC 74LS153 integrated circuit is used for the data selectors $DS_1$, $DS_2$ will be explained as a definite example. The truth table of 74LS153 integrated circuit as the data selectors $DS_1$, $DS_2$ is tabulated below:

| B | A | Y |
|---|---|---|
| L | L | $C_0$ |
| L | H | $C_1$ |
| H | L | $C_2$ |
| H | H | $C_3$ |

The signals applied to the terminals $C_0$–$C_3$ are transferred to the outputs $A_0$–$D_0$ in accordance with the combination of the select inputs A and B. In the OFF mode, $C_1$ is selected at A=H and B=L because only the signal l is low. In the recording mode, $C_0$ is selected at A=L, B=L because only the signal o is low and the output of the counter CNT is transferred to the outputs $A_0$–$D_0$. In the playback mode, $C_2$ is selected at A=L and B=H because only the signal n is low. In the monitor mode, $C_3$ is selected at A=H and B=H because only the signal m is low.

The relation between the output signals $A_0$, $B_0$, $C_0$, $D_0$ in the circuit construction described above and what each status indicates is tabulated below.

| Data output | | | | Station and | |
|---|---|---|---|---|---|
| $A_0$ | $B_0$ | $C_0$ | $D_0$ | data output | |
| L | L | L | L | OFF DATA | |
| H | L | L | L |  | station | recording mode. |
| L | H | L | L | xx station | channel data |
| H | H | L | L | ΔΔ station | |
| L | L | H | L | x station | |
| H | L | H | L | x station | |
| L | H | H | L | xΔ station | |
| H | H | H | L | Δx station | |
| L | L | L | H | Δ  station | |
| H | L | L | H | Δ  station | |
| L | H | L | H | □□ station | |
| H | H | L | H | □— station | |
| L | L | H | H | —— station | |
| H | L | H | H | —□ station | |
| L | H | H | H | playback data | |
| H | H | H | H | monitor data | |

In this table, the recording data is not shown because if channel data exists, it is obvious that the video tape recorder is in recording mode. The number of channels that can be determined is 13 in this table, but the number of channels can be increased simply by increasing the number of stages of the counter CNT in the data encoder 15 and the number of inputs to the data selectors $DS_1$ and $DS_2$.

Turning back again to FIG. 1, the operation of determining the channels of the television will be described. In this technique for channel determination two kinds of comparison, that is, the comparison of the sound intermediate frequency signals and the comparison of the audio signals, are always effected on the signals from the television TV and the signals from the tuner 18 so that when the channel can not be discriminated by the comparison of the sound intermediate frequency signals, the comparison of the audio signals is employed. In the channel discrimination of the video tape recorder described already, the tuner inside the video tape recorder VTR and the separate tuner 3 directly receive the broadcast wave so that whether or not the same broadcast is being received can be identified by comparing the sound intermediate frequency signals. In the case of the sound intermediate frequency signals detected from inside the television TV, on the other hand, there is the possibility that the signal is the one remodulated by the video tape recorder VTR. In such a case, the comparison of the sound intermediate frequency signals will not indicate that the signals are the same, even when the broadcast is the same. This is because that characteristics of the signal remodulated by the modulation circuit inside the video tape recorder VTR are subtly different from those of the broadcast wave transmitted by the broadcasting station. For this reason, the sound intermediate frequency signals having high stability can not be compared with each other, and in such a case, the audio signals are mutually compared to determine whether the signals are of the same broadcast signal. Incidentally, the comparison of the sound intermediate frequency signals is superior because since the signals are FM, signals there is no need to take the amplitude into consideration and the signals are stable with respect to external disturbances such as noise.

For the reasons described above, the television channel discrimination unit consists of the sound intermediate frequency signal comparison unit, the audio signal comparison unit and a gate circuit (AND circuit) for selecting the results of the comparisons by these units. Accordingly, the tuning control voltage generation circuit 17, tuner 18, video intermediate frequency amplification-detection circuit 19, sound intermediate frequency amplification circuits 20, 22 and the sound intermediate frequency signal comparison circuit IFC have exactly the same construction as those of the channel discrimination unit for the video tape recorder, and exactly the same operation is effected to compare the sound intermediate frequency signals.

On the other hand, the audio detection-amplification circuits 21, 23 are connected to the sound intermediate frequency amplification circuits 20 and 22, respectively, to obtain the audio signals, and the demodulated audio signals are applied to the audio signal comparison circuit ASC. Next, the output signals of the sound intermediate frequency signal comparison circuit IFC and audio signal comparison circuit ASC are applied to one end of each of the AND circuits 24 and 25 and the output signals of these AND circuits are combined by the OR circuit 26 and then applied to the data encoder 27. Incidentally, this data encoder 27 is constructed in substantially the same way as the data encoder 15 shown in FIG. 6. In such a case, the control input g to the counter CNT becomes the output of the OR circuit 26 so that the binary output of the counter CNT is applied to the tuning voltage generation circuit 17.

The signal from the tuning voltage generation circuit 17 is applied to the other end of the AND gates 24 and 25 as the gate opening signal and a complementary operation is effected by an inverter I. The control signals to be applied to the AND gates 24 and 25 are inverted at the stage where the tuning voltage generation circuit 17 finishes generating a series of signals corresponding to each channel in accordance with a predetermined sequence, and the operation described above is repeated until the results of the comparison coincide. More definitely, a flip-flop disposed inside the tuning control voltage generation circuit 17 is inverted by the carry signal of the counter when the binary output of the counter applied to the tuning control voltage generation circuit is at full-count, and the output signal of this flip-flop is used as the control signal for the gates.

The sound intermediate frequency signal from the tuner inside the television TV, detected by the sensor $S_4$, and the sound intermediate frequency signal detected from the separate tuner 18 are compared with each other by the sound intermediate frequency signal comparison circuit IFC. The tuning positions of the tuning control voltage generation circuit 17 are then sequentially advanced by the signal delivered from the counter inside the data encoder 27 until the signals coincide. If a coincidence point is found during this process, the data at that time is delivered as the channel data from the data encoder 27. If no coincidence point is found out even after the scanning of all the channels, the signals applied to the AND circuits 24 and 25 invert and comparison is changed over to the audio signals. Incidentally, the timing of the television and the video tape recorder is not constant because their channels are operated manually. Hence, occasionally no coincidence point is found even in the comparison period of the audio signals. In this case the control signals to the AND circuits 24, 25 invert again and comparison shifts to the sound intermediate frequency signals.

Figure 7:
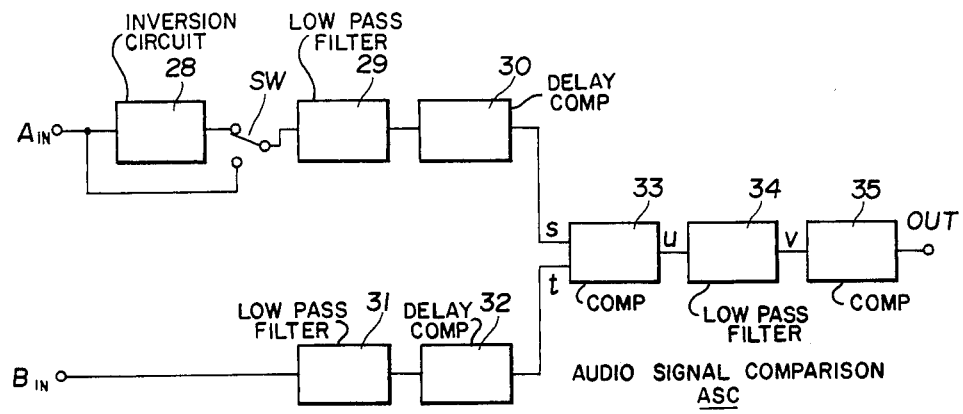

FIG. 7 shows the audio signal comparison circuit ASC described above in further detail. It is generally believed to be difficult to compare audio signals because adjustment of the input levels is critical. In this embodiment, however, a stable operation can be arrived at by use of a relatively simple construction.

In FIG. 7, a switch SW determines whether the input to the low-pass filter 29 comes directly from $A_{IN}$ or is passed through the audio signal inversion circuit 28. The signal $B_{IN}$ is always applied directly to the low-pass filter 31. Here, the audio signal inversion circuit 28 is used to cope with the occasional situation when the audio signals to be compared are substantially the same, but one of the signals is inverted due to the characteristics of the circuit as a result of re-modulation of the sound of the video tape recorder VTR. That is, the polarity of the signal is examined in advance and the change-over switch SW is set accordingly. The lowpass filters 29 and 31 are disposed so as to cut the high frequency components to a range in which the identity of the audio signals can be recognized and to make the comparison simple.

Figure 8A:
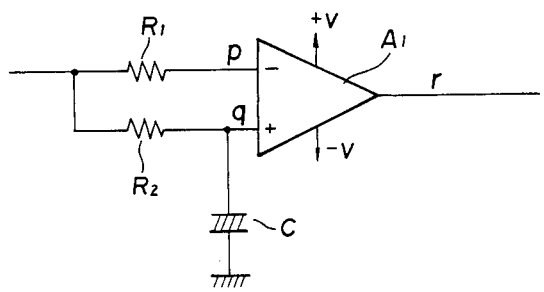
FIG. 8A is a partial detailed view of FIG. 7.
Figure 8B:
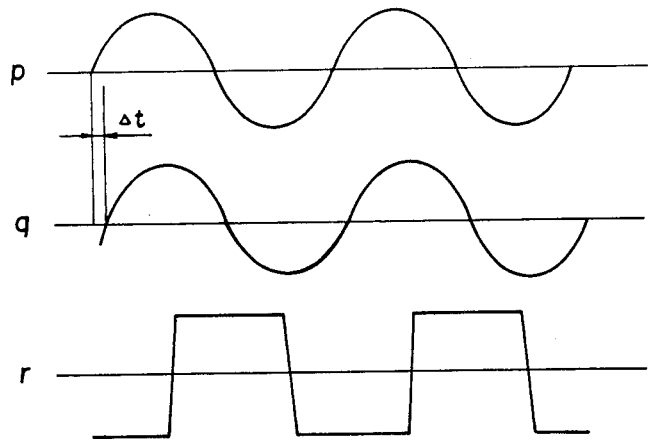
FIG. 8B is a diagram of the operation of the circuit of FIG. 8A.

The output signals of the lowpass filters 29 and 31 are applied to $\Delta t$ delay voltage comparators 30 and 32, respectively, and the output signals of these comparators are applied to a voltage comparator 33. A lowpass filter 34 and a voltage comparator 35 are sequentially connected downstream of the voltage comparator 33 to extract the output OUT. The $\Delta t$ delay voltage comparators 30 and 32 discriminate the rise and fall of the signal waveforms applied thereto and produce the high or low level output signals, and are constructed as shown in FIG. 8A, for example. In this drawing, the input signal is fed to two paths by resistors $R_1$ and $R_2$. One end of the resistor $R_1$ is connected to an inversion input terminal of an operational amplifier $A_1$ while one end of the resistor $R_2$ is connected to its non-inversion input terminal. Further, a capacitor C is interposed between the non-inversion input terminal of the operational amplifier $A_1$ and the ground. FIG. 8B shows the voltage waveforms at both input terminals p,q and at the output terminal r of the operational amplifier $A_1$ at the points shown in FIG. 8A. The voltage waveform at the point q is delayed by a time $\Delta t$ from the voltage change at the point p due to the delay action of the capacitor C and hence, the operational amplifier $A_1$ receiving the voltages signals at the points p and q as its input produces a low level signal in the rise period of the signal voltage and a high level signal in the fall period.

Figure 9:
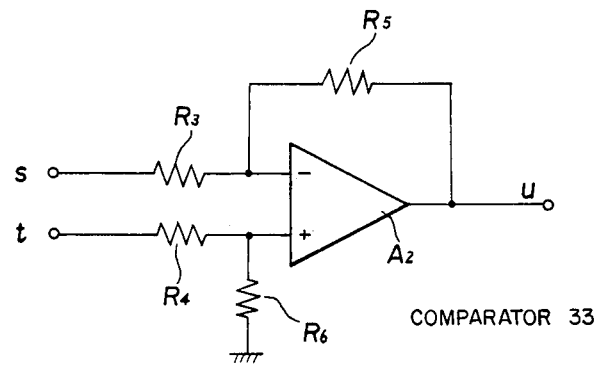
FIG. 9 is a partial detailed view of FIG. 7.

FIG. 9 illustrates definitely the voltage comparator 33 shown in FIG. 7. Points s and t, to which the output signals of the $\Delta t$ delay voltage comparators 30 and 32 are applied, are connected to the inversion input terminal and non-inversion input terminal of the operational amplifier $A_2$ via resistors $R_3$ and $R_4$, respectively. A resistor $R_5$ is interposed between the inversion input terminal and the output terminal, and a resistor $R_6$ between the non-inversion input terminal and the ground. Here, the resistors must satisfy the following relation:

$$R_5/R_3=R_6/R_4$$

because when the signals of the same level are applied to the two input terminals s and t, the degree of amplification of both signals must be equal to each other so that they offset each other and the output becomes zero. If $R_3=R_4=R_5=R_6$, for example, the amplifier operates as a differential amplifier of a gain 1. When signals of the same level are applied, the output becomes zero and when the signals have opposite polarities, the output gets into saturation at the low or high level.

Figure 10:
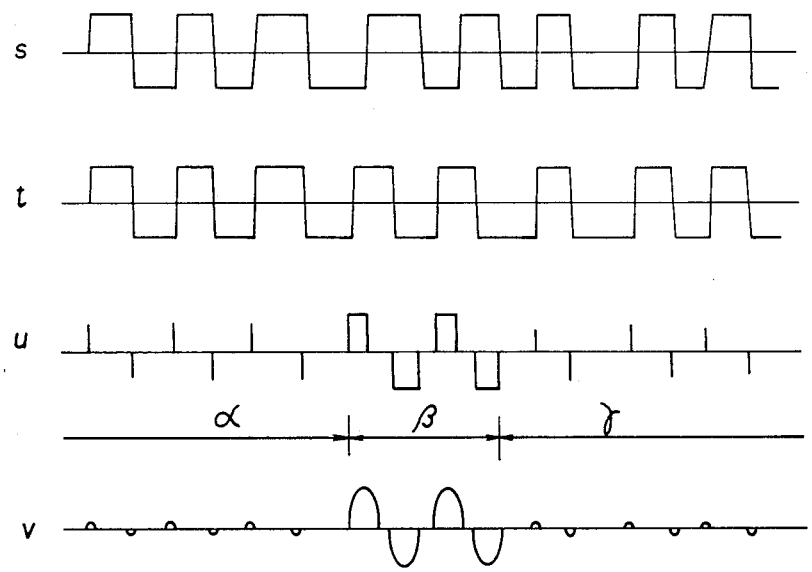
FIG. 10 is a diagram of the operation of the circuit of FIG. 7.

FIG. 10 shows the voltage waveforms the outputs s, t of the $\Delta t$ delay voltage comparators 30 and 32, output u of the voltage comparator 33, and output v of the lowpass filter 34. Symbols ($\alpha$) and ($\gamma$) represent the period where the two signals are the same and ($\beta$) represents the period where different signals are applied. After the pulse-like noise from the delay between the signals is removed by the lowpass filter 34, the signal is shaped into a square waveform by the voltage comparator 35 and becomes the output signal OUT.

In FIG. 1, if the coincidence point is found from the comparison of the sound intermediate frequency signals or the comparison of the audio signals, the tuning control voltage generation circuit 17 stops changing the tuning voltage and the counter output inside the data encoder 27 providing the control signals to the tuning control voltage generation circuit 17 is produced as the channel data.

When this invention is used in practice for measuring the audience rating, a circuit for detecting the time data is also necessary, but the construction of the conventional videometer can be used as such. The videometer includes a known time mechanism and a recording mechanism for recording the resulting time data and audience data.

While only a single embodiment of the invention has been shown and described in detail, there will now be obvious to those skilled in the art many modifications and variations satisfying many or all of the objects of the invention without departing from the spirit thereof as defined by the appended claims.

What is claimed is:

1. An audience rating measuring system for a television receiver adapted for receiving a plurality of channels and a video tape recorder having a plurality of operation modes connected thereto and adapted for selectively receiving said channels, said system comprising:

video tape recorder channel discrimination means for detecting the channels received by the video tape recorder;

video tape recorder operation mode discrimination means for detecting the operation modes of the video tape recorder; and television channel discrimination means for detecting the channels received by the television receiver; said audience measuring system detecting the modes of the video tape recorder and the television receiver when used in combination.

2. An audience rating measuring system as claimed in claim 1 wherein the video tape recorder generates a first sound intermediate frequency signal, said video tape recorder channel discrimination means comprising a tuner for generating a controllably variable second sound intermediate frequency signal and a sensor disposed inside said video tape recorder for detecting the first sound intermediate frequency signal generated by said video tape recorder, means for controllably vary said tuner to varying said second sound intermediate frequency signal until it coincides with the first sound intermediate frequency signal of said video tape recorder and means for indicating the tuning position of said tuner at the time of coincidence.

3. An audience rating measuring system as claimed in claim 1 wherein said operation mode discrimination means comprises a first power ON/OFF detection means for detecting the power-on of said video tape recorder and the increase or decrease in an inflow current, second power ON/OFF detection means for detecting the power-on of said television receiver, erase signal detection means for detecting erase signals of said video tape recorder; and logic means for operating on the detection outputs of said first and second power ON/OFF detection means, said erase signal detection means and said channel discrimination means for determining the operation state of said video tape recorder in four operation modes of OFF, monitor, playback and recording.

4. An audience rating measuring system as claimed in claim 1 wherein the television receiver generates a first sound intermediate frequency signal and said television channel discrimination means comprises a tuner which generates a second sound intermediate frequency signal which sequentially changes in frequency and a sensor disposed inside said television receiver for sensing said first sound intermediate frequency signal; means for comparing for coincidence of the first sound intermediate frequency signal of said television receiver with the second sound intermediate frequency signal; means when both of said signals coincide for determining the channel of said television receiver; means for generating a first audio signal obtained by demodulating the first sound intermediate frequency signal of said television receiver; means for generating a second audio signal obtained by demodulating the second sound intermediate frequency signal of said tuner; and an audio signal comparison means operative when no coincidence can be obtained between said first and second sound intermediate frequency signals comparison so that the channel of said television receiver is determined from the tuning position of said tuner by detecting coincidence of said first and second audio signals.

5. An audience rating measuring system as claimed in claim 4 wherein said audio signal comparison means comprises a first delay voltage comparator means for receiving a first audio signal and detecting the rise and fall of the signal waveform, a second delay voltage comparator means for receiving a second audio signal and detecting the rise and fall of the signal waveform, and means comparing the output signals of said first and second time delay voltage comparator means for determining the coincidence of said first and second audio signals.

6. Apparatus for determining the operating state of a video tape recorder having erase signals and a reception channel and further having OFF, playback and recording modes of operation comprising a power ON/OFF detection means for detecting the power-on of the video tape recorder, erase signal detection means for detecting the erase signals of said video tape recorder and channel discrimination means for detecting the reception channel of said video tape recorder; and logic means operating on the detection outputs of said first power ON/OFF detection means, said erase signal detection means and said channel discrimination means for determining in which of the OFF, playback and recording modes the video tape recorder is operating.

* * * * *